(12) United States Patent
Park

(10) Patent No.: US 11,894,946 B2
(45) Date of Patent: Feb. 6, 2024

(54) VEHICLE HETEROGENEOUS COMMUNICATION SYSTEM AND COMMUNICATION METHOD THEREFOR

(71) Applicants: Hyundai Motor Company, Seoul (KR); Kia Corporation, Seoul (KR)

(72) Inventor: Soonchul Park, Hanam-si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 0 days.

(21) Appl. No.: 18/078,497

(22) Filed: Dec. 9, 2022

(65) Prior Publication Data

US 2023/0246874 A1 Aug. 3, 2023

(30) Foreign Application Priority Data

Feb. 3, 2022 (KR) .......................... 10-2022-0014198

(51) Int. Cl.
*H04L 12/40* (2006.01)
(52) U.S. Cl.
CPC ............... *H04L 12/40143* (2013.01); *H04L 2012/40273* (2013.01)

(58) Field of Classification Search
CPC ............... H04L 12/40143; H04L 2012/40273
See application file for complete search history.

(56) References Cited

U.S. PATENT DOCUMENTS

| 11,487,682 | B1* | 11/2022 | Deb | ...................... H04L 49/901 |
| 2021/0092019 | A1* | 3/2021 | Fang | ................... H04L 61/4511 |
| 2021/0192867 | A1* | 6/2021 | Fang | ................... G07C 5/0816 |

* cited by examiner

*Primary Examiner* — Luat Phung
(74) *Attorney, Agent, or Firm* — Fish & Richardson P.C.

(57) ABSTRACT

A vehicle heterogeneous communication system for efficient CAN message transmission between heterogeneous communication controllers in a vehicle includes: a first transceiving controller transmitting a CAN message delivery Ethernet frame to which an SSD4 symbol added by changing an SSD size compared with a general Ethernet frame; and a second transceiving controller recognizing the received Ethernet frame as the CAN message delivery Ethernet frame when there is the SSD4 symbol by checking the SSD of Ethernet frame received from the first transceiving controller, and performing CAN message delivery Ethernet frame processing in which a media access control (MAC), Internet protocol (IP), and user datagram protocol (UDP) analysis step in the general Ethernet frame processing process is omitted.

20 Claims, 8 Drawing Sheets

<Vehicle general Ethernet frame structure>

<CAN message delivery Ethernet frame structure>

VEHICLE HETEROGENEOUS COMMUNICATION SYSTEM AND COMMUNICATION METHOD THEREFOR

CROSS-REFERENCE TO RELATED APPLICATION

This application claims priority to and the benefit of Korean Patent Application No. 10-2022-0014198 filed in the Korean Intellectual Property Office on Feb. 03, 2022, the entire contents of which are incorporated herein by reference.

TECHNICAL FIELD

The present disclosure relates to a vehicle heterogeneous communication system and a communication method therefor, and more particularly, to a vehicle heterogeneous communication system and for rapid message delivery between an Ethernet device and a CAN device applied to the inside of a vehicle, and a delivery method of the message.

BACKGROUND

A conventional vehicle is evolving into the forms of smart cars and connected cars as IT technologies for convenience, safety, economics and eco-friendliness are integrated. In addition, as mechanical devices required for existing vehicles are made to be electronic, numerous electronic control units (ECUs) are being added.

For example, the conventional vehicle has dozens of computers and various software written in hundreds of millions of codes built therein, and they are communicating through heterogeneous communication networks such as Ethernet and CAN in the vehicle.

These vehicle heterogeneous communications require rapid real-time transmission performance and quality in Advanced Driver Assistance Systems (ADAS), autonomous driving control and various system inspections applied to mass production vehicles.

In general, the Ethernet frame has a structure in which the Ethernet header/tail used by the physical layer and the CAN frame are inserted into the Ethernet payload. The CAN frame includes a MAC/IP/UDP header used in the UDP/IP protocol suitable for the control CAN message transmission. Here, when transmitting the maximum CAN message (71 byte), 42 bytes are required only for the header of the CAN frame, and approximately 37% of the 113 bytes of the entire Ethernet frame size are used as the header of the CAN frame.

In this way, when transmitting a CAN message to a general Ethernet frame by the size of ancillary header frame, the entire frame size is excessively larger than the valid data. This can lead to a disadvantage in which time is delayed in processing CAN data. In addition, there is a disadvantage in which S/W costs increase by using the UDP/IP stack to send and receive a general Ethernet frame.

SUMMARY

The present disclosure has been made in an effort to provide a vehicle heterogeneous communication system and a communication method therefor, which reduce a processing time and efficiently perform communication by using a CAN message delivery Ethernet frame having a shortened size between an Ethernet controller and a CAN controller in in-vehicle communication.

The present disclosure is directed to a vehicle heterogeneous communication system for efficient CAN message transmission between heterogeneous communication controllers in a vehicle, which includes: a first transceiving controller transmitting a CAN message delivery Ethernet frame to which an SSD4 symbol added by changing an SSD size compared with a general Ethernet frame; and a second transceiving controller recognizing the received Ethernet frame as the CAN message delivery Ethernet frame when there is the SSD4 symbol by checking the SSD of Ethernet frame received from the first transceiving controller, and performing CAN message delivery Ethernet frame processing in which a media access control (MAC), Internet protocol (IP), and user datagram protocol (UDP) analysis step in the general Ethernet frame processing process is omitted.

Further, the first transceiving controller and the second transceiving controller may be transceiving controllers having the same configuration for rapid message delivery between heterogeneous communications of an Ethernet and a CAN in the vehicle, and may be applied to at least one of an Ethernet controller and a gateway in the vehicle.

Further, the CAN message delivery Ethernet frame may have a size larger than a basic SSD size in the general Ethernet frame as a size of a preamble is further assigned to an SSD resource as compared with the general Ethernet frame.

Further, the CAN message delivery Ethernet frame does not include the MAC, IP, and UDP stacks in the vehicle general Ethernet frame, so the CAN message delivery Ethernet frame has a shortened frame size.

Further, the first transceiving controller and the second transceiving controller may include a micro controller unit (MCU) generating the CAN message delivery Ethernet frame through MAC; a physical layer (PHY) module supporting a function for transceiving the CAN message delivery Ethernet frame; and a media independent interface (MII) to which a CAN dedicated line is added for transmission of the CAN message delivery Ethernet frame apart from a general media independent interface (MII) line transceiving a general Ethernet frame between the MCU and the PHY module.

Further, upon transmitting the Ethernet frame, the PHY module may generate three basic SSDs for the general Ethernet frame received through the CAN dedicated line, and generate four SSDs to which a symbol SSD4 is added for the CAN message delivery Ethernet frame received through the CAN dedicated line and transmit the generated four SSDs to a receiving side.

Further, upon receiving the Ethernet frame, the PHY module may determine the corresponding Ethernet frame as the CAN message delivery Ethernet frame when there is the added SSD4 symbol by checking the number of SSDs, and determine the corresponding Ethernet frame as the general Ethernet frame when the SSD4 symbol is not present.

Further, the PHY module may select the CAN dedicated line and deliver the CAN message delivery Ethernet frame to the MCU when determining that the CAN message delivery Ethernet frame is received, and select the general MII line and deliver the general Ethernet frame to the MCU when determining that the general Ethernet frame is received.

Further, the MCU may include a first processing module processing the general Ethernet frame received through the general MII and storing the processed general Ethernet frame in a memory, and a second processing module processing the CAN message delivery Ethernet frame received through the CAN dedicated line, and storing the processed CAN message delivery Ethernet frame in a CAN message storage memory.

Further, the second processing module may remove an Ether Header and an Ether Tail of the CAN message delivery Ethernet frame received through the CAN reception signal line, and then store only the CAN message in the CAN message storage memory.

Further, the second processing module may check a CAN ID in an APP Task when transmitting the CAN message, and then select a CAN network through which the CAN message is to be delivered, and transmit the CAN message to a CAN controller through a transceiver.

The present disclosure is also directed to a vehicle heterogeneous communication method for CAN message transmission of a transceiving controller, which includes: a) generating, by an MCU, a CAN message delivery Ethernet frame in which an SSD size is changed through MAC; b) delivering the CAN message delivery Ethernet frame to a PHY module through a CAN dedicated line added to a media independent interface (MII); c) checking, by the PHY module, the Ethernet frame received through the CAN dedicated line and recognizing the Ethernet frame as the CAN message delivery Ethernet frame; and d) inserting, by the PHY module, four SSDs acquired by adding an SSD4 symbol into the CAN message delivery Ethernet frame, and transmitting the CAN message delivery Ethernet frame to a receiving side.

Further, the CAN message delivery Ethernet frame has a shortened frame size by omitting the MAC, IP, and UDP stacks in the vehicle general Ethernet frame.

Further, in step b) above, by setting MII signal line setting to CAN_TX_EN=1 and TX_EN=0, the CAN dedicated line may be selected among the MII lines.

Further, step c) above may include checking, by the PHY module, whether the MII signal line setting is TX_EN=1 or CAN_TX_EN=1 when receiving the Ethernet frame, and determining the corresponding Ethernet frame as the general Ethernet frame when the MII signal line setting is TX_EN=1, and determining the corresponding Ethernet frame as the CAN message delivery Ethernet frame when the MII signal line setting is CAN_TX_EN=1.

Further, step d) above may include transmitting four SSDs to the receiving side, transmitting a CAN message which is the remaining data to the receiving side after completing transmission of four SSDs, and transmitting to the receiving side an ESD indicating an end of the CAN message delivery Ethernet frame when confirming data transmission completion.

The present disclosure is also directed to a vehicle heterogeneous communication method for CAN message reception of a transceiving controller, which includes: a) checking, by a PHY module, whether there is SSD4 symbol by checking the number of SSDs when receiving an Ethernet frame from a transmitting side; b) determining the corresponding Ethernet frame as a CAN message delivery Ethernet frame when the number of SSDs is 4 and the SSD4 symbol is present; c) delivering the CAN message delivery Ethernet frame to an MCU through a CAN dedicated line added to a media independent interface (MII); and d) performing, by the MCU, processing of the CAN message delivery Ethernet frame through MAC, and then storing the CAN message delivery Ethernet frame in an internal CAN message storage memory.

Further, the CAN message delivery Ethernet frame has a shortened frame size by omitting the MAC, IP, and UDP stacks in the vehicle general Ethernet frame.

Further, step c) above may include recovering preambles for four SSDs of the CAN message delivery Ethernet frame, and then delivering the recovered preambles to the MCU, delivering a CAN message which is the remaining data to the MCU after completing transmission of the recovered preambles, and determining that receiving the CAN message is completed when receiving an ESD from the transmitting side.

Further, step d) above may include determining, when the CAN dedicated line frame is received or it is checked whether MII signal line setting is CAN_RX_DV=1, that the CAN message delivery Ethernet frame is received, and delivering the CAN message delivery Ethernet frame through MAC, by a reconciliation of the MCU, and storing only the CAN message in the internal CAN dedicated memory after processing of removing an Ether Header and an Ether Tail of the CAN message delivery Ethernet frame in the MAC.

In some implementations, a configuration of an improved physical layer (PHY, MAC) and an Ethernet frame processing method for efficient CAN message delivery between an Ethernet controller and a CAN controller in a vehicle can be provided. As a result, rapid message transmission is possible and a processing time can be shortened.

In some implementations, the present disclosure supports both transmission functions of a CAN message delivery Ethernet frame and an general Ethernet frame, which can be 100% compatible with an Ethernet controller of an existing vehicle using a general PHY. Further, there can be an effect that it is not necessary to use a TCP/UDP IP stack for Ethernet communication processing, so material costs for use of an existing S/VV stack can be saved.

DETAILED DESCRIPTION

Figure 1:
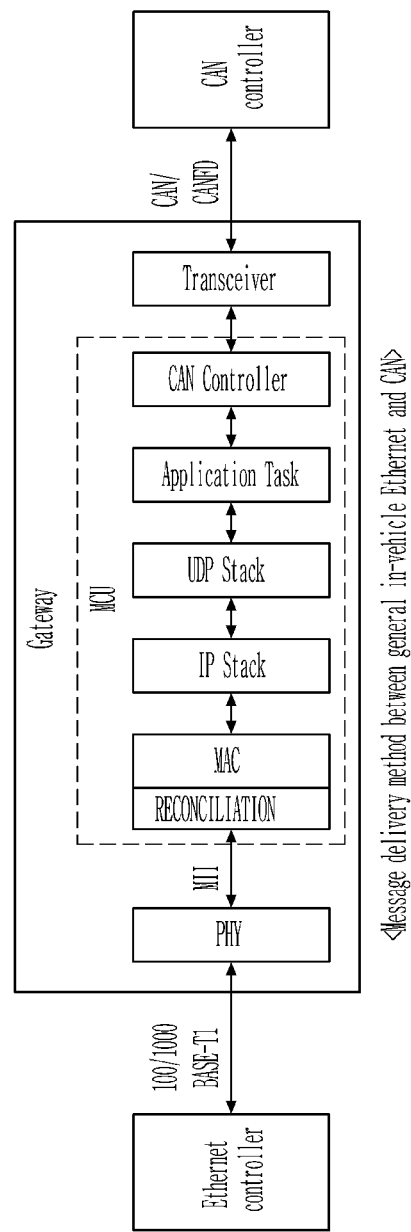
FIG. 1 illustrates a method for CAN message delivery to a CAN controller from a general in-vehicle Ethernet controller.

FIG. 1 illustrates a method for CAN message delivery to a CAN controller from a general in-vehicle Ethernet controller.

Referring to FIG. 1, in general, the in-vehicle Ethernet controller transmits an Ethernet frame to a gateway and the gateway processes the Ethernet frame as a CAN message and delivers the Ethernet frame to a CAN controller.

In this case, a general Ethernet frame processing process is described below. When a PHY of the gateway receives the Ethernet frame, a start of stream delimiter (SSD) and an end of stream delimiter (ESD) are checked, and then, a micro controller unit (MCU) of the gateway performs an MAC analysis step, an IP analysis step, a UDP analysis step, a data extraction and processing step, and a step of storing the processed CAN message by a first in first out (FIFO) scheme. In addition, the CAN message is transmitted to the CAN controller through a CAN transceiver of the gateway.

Figure 2:
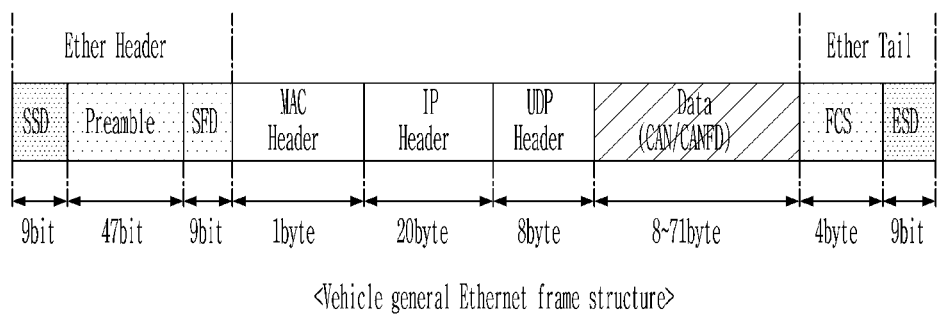
FIG. 2 illustrates a general Ethernet frame configuration used for heterogeneous communication between Ethernet and CAN in a vehicle.

FIG. 2 illustrates a general Ethernet frame configuration used for heterogeneous communication between Ethernet and CAN in a vehicle.

Referring to FIG. 2, by using an MAC/IP/UDP header of the general Ethernet frame, a header frame occupies at least 37% and up to 84% of a total frame, which increases a total frame size. Therefore, a processing time of software (S/W) for analyzing the Ethernet frame is required. As a result, a time for actual CAN message processing is delayed, so real-time transmission performance deteriorates.

Therefore, the present disclosure has been made in an effort to provide a vehicle heterogeneous communication system and a communication method therefor for efficient communication between an Ethernet controller and a CAN controller in in-vehicle communication.

Figure 3:
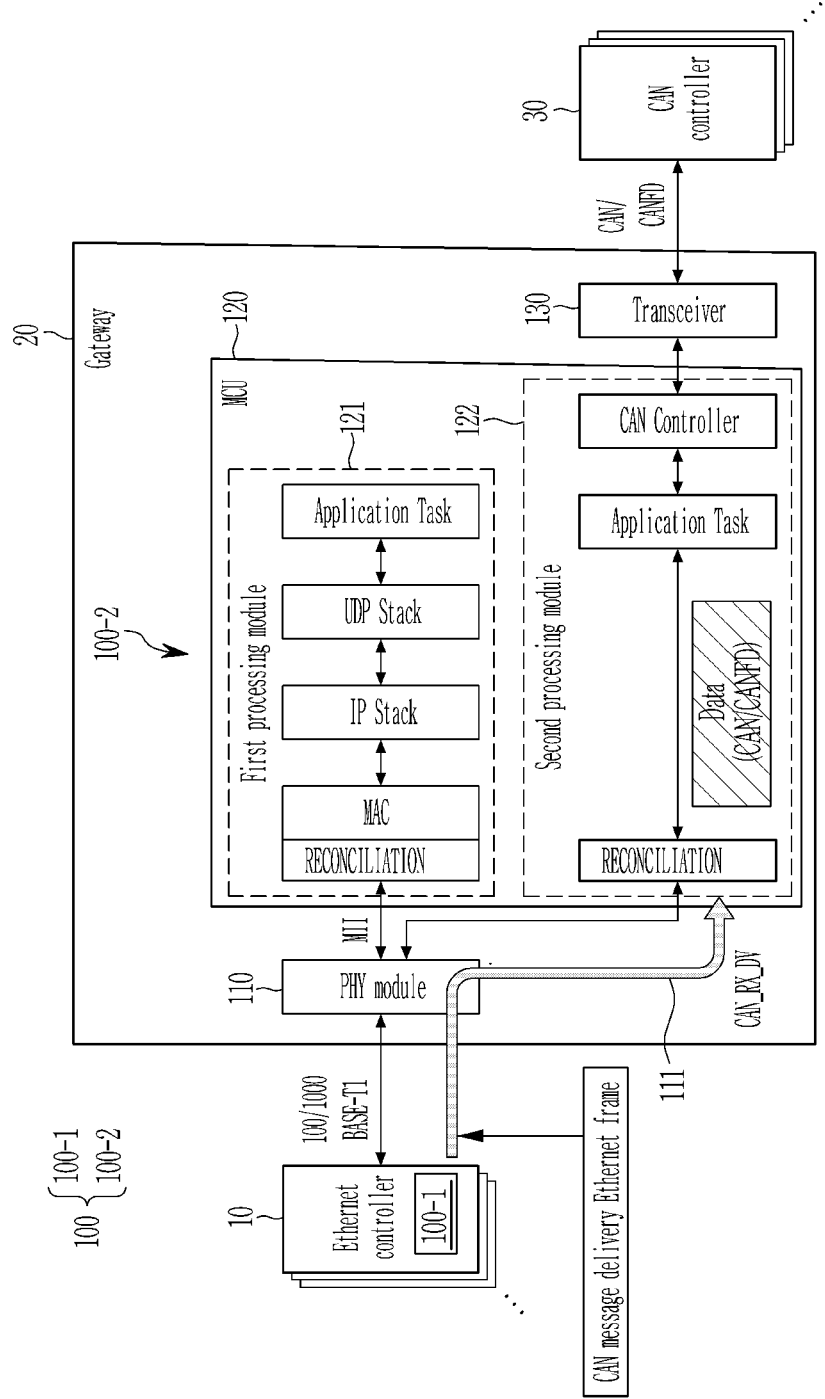
FIG. 3 illustrates an example of a CAN message delivery configuration of a vehicle heterogeneous communication system.

FIG. 3 illustrates an example of a CAN message delivery configuration of a vehicle heterogeneous communication system.

Figure 4:
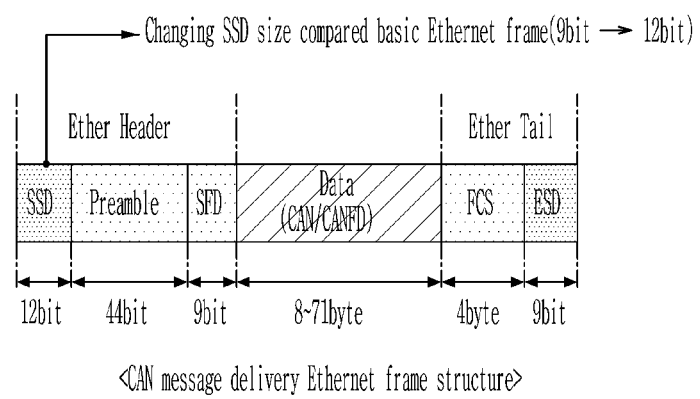
FIG. 4 illustrates an example of a structure of a CAN message delivery Ethernet frame.

FIG. 4 illustrates an example of a structure of a CAN message delivery Ethernet frame.

Referring to FIGS. 3 and 4, a vehicle heterogeneous communication system for efficient CAN message transmission between heterogeneous communication controllers in a vehicle includes a first transceiving controller 100-1 and a second transceiving controller 100-2.

The first transceiving controller 100-1 may transmit a CAN message delivery Ethernet frame to which an SSD4 symbol is added by changing an SSD size compared with the general Ethernet frame.

The second transceiving controller 100-2 may receive the Ethernet frame from the first transceiving controller 100-1, recognize the received Ethernet frame as the CAN message delivery Ethernet frame when there is the SSD4 symbol by checking the SSD of the received Ethernet frame, and perform CAN message delivery Ethernet frame processing in which a media access control (MAC), Internet protocol (IP), and user datagram protocol (UDP) analysis step in the general Ethernet frame processing process is omitted.

The first transceiving controller 100-1 and the second transceiving controller 100-2 are transceiving controllers 100 having the same configuration for rapid message delivery between heterogeneous communication the Ethernet and the CAN in the vehicle, and may be applied to at least one of the Ethernet controller 10 and the gateway 20.

For example, as illustrated in FIG. 3, the transceiving controller 100 may be applied to each of the Ethernet controller 10 and the gateway 20. When the transceiving controller 100 serves as a transmitting side in each of the Ethernet controller 10 and the gateway 20, the transceiving controller 100 is distinguished as the first transceiving controller 100-1 and when the transceiving controller 100 serves as a receiving side in each of the Ethernet controller 10 and the gateway the transceiving controller 100 is distinguished as the second transceiving controller 100-2.

The first transceiving controller 100-1 applied to the Ethernet controller 10 generates a CAN message delivery Ethernet frame including Ether Header, CAN message, and Ether Tail for CAN message transmission, and changes an SSD size compared with the general Ethernet frame.

Here, the Ether Header includes an SSD having a start of the frame and specified processing information, a preamble used for synchronization of the transmitting side and the receiving side, and a start of frame delimiter (SFD) indicating an end of the preamble. In addition, the Ether Tail includes a fame check sequence (FCS) for detecting damaged data (i.e., error) in the entire frame and an ESD indicating the end of the Ethernet frame.

In general, in the general Ethernet frame, 9 bits in the preamble may be assigned to a resource for the SSD.

Contrary to this, in the CAN message delivery Ethernet frame, a predetermined size (3 bits) of the preamble may be further assigned to the resource of the SSD as compared with the general Ethernet frame. Then, the SSD may have a size (12 bits) larger than a basic SSD size (9 bits) in the general Ethernet frame.

That is, the first transceiving controller 100-1 changes the size of the SSD by assigning SSD a predetermined size (3 bits) of the preamble which is not used upon the CAN message transmission, and additionally inserts the SSD4 symbol for recognizing CAN message processing into the changed SSD to generate the CAN message delivery Ethernet frame.

Further, the CAN message delivery Ethernet frame does not include the MAC, the IP, and the UDP stack of the general Ethernet frame for the vehicle, so the CAN message delivery Ethernet frame has a shortened frame size.

The second transceiving controller 100-2 applied to the gateway 20 serves as a relay that processes the CAN message delivery Ethernet frame transmitted by the first transceiving controller 100-1 and transmits the processed CAN message delivery Ethernet frame to the CAN controller 30. A plurality of Ethernet controllers 10 and CAN controllers 30 may be connected to both ends of the gateway 20, respectively.

As such, the transceiving controller 100 applied to each of the Ethernet controller 10 and the gateway 20 includes a PHY module 110, a micro controller unit (MCU) 120, and a transceiver 130.

The PHY module 110 is a communication interface (I/F) that transceives the Ethernet frame on Ethernet media, and is configured in the form of a chip and supports a function for transceiving the CAN message delivery Ethernet frame.

The PHY module 110 may deliver the Ethernet frame received from the MCU 120 to the receiving side according to which role of transmission and reception the transceiving controller adopting the PHY module 110 plays or deliver the Ethernet frame received from the transmitting side to the MCU 120.

When the PHY module 110 is configured in the transmitting side as the Ethernet controller 10 of FIG. 1, three basic SSDs (SSD1, SSD2, SSD3=9 bits) may be generated according to an Ethernet standard for the general Ethernet frame, and a total of four SSDs (SSD1, SSD2, SSD3, SSD4=12 bits) acquired by adding the SSD4 symbol to three basic SSDs for the CAN message delivery Ethernet frame and transmitted to the receiving side.

On the contrary, when the PHY module 110 is configured in the receiving side as in the gateway 20 of FIG. 1, the number of SSDs of the Ethernet frame received from the transmitting side is checked and when the number of SSDs is three (SSD1, SSD2, SSD3), the received Ethernet frame is determined as the general Ethernet frame and when the number of SSDs is four (SSD1, SSD2, SSD3, SSD4), the received Ethernet frame is determined as the CAN message delivery Ethernet frame.

The PHY module 110 is connected to the MCU 120 through a media independent interface (MII).

The MII includes a general MII line for transceiving the general Ethernet frame according to the Ethernet standard, and a CAN dedicated line 111 added for transmission of the CAN message delivery Ethernet frame. In this case, the CAN dedicated line 111 additionally configured in the MII is distinguished into a CAN transmission signal line CAN_TX_EN applied to the transmitting-side PHY module 110 and a CAN reception signal line CAN_RX_DV applied to the receiving-side PHY module 110 (see FIGS. 5 and 6).

The MCU 120 controls an overall operation for processing the Ethernet frame transceived in the physical layer (PHY, MAC) of the applied device (e.g., Ethernet controller/gateway), and includes at least one program and data for the control.

The MCU 120 includes a first processing module 121 processing the general Ethernet frame transceived from the PHY module 110 and a second processing module 122 processing the CAN message delivery Ethernet frame apart therefrom.

The first processing module 121 processes the general Ethernet frame received through the general MII of the PHY module 110, and the processing process includes the MAC analysis step, the IP analysis step, the UDP analysis step, the data extraction and processing step, and the step of storing the processed data by the first in first out (FIFO) scheme as described above.

The second processing module 122 processes the CAN message delivery Ethernet frame received through the CAN dedicated line 111 of the PHY module 110, and the processing process includes a step of storing a CAN message (data) processed by extracting data by the first in first out (FIFO) scheme by omitting the MAC analysis step, the IP analysis step, and the UDP analysis step unlike the first processing module 121.

In this reconciliation of the second processing module 122, the Ether Header and the Ether Tail of the CAN message delivery Ethernet frame received through a CAN reception signal line CAN_RX_DV may be removed, and then only the CAN message may be stored in an internal CAN dedicated memory.

Further, the second processing module 122 checks a CAN ID in an APP Task, and then selects a CAN network to be delivered and transmits the CAN message to the CAN controller 30 through the transceiver 130 when transmitting the CAN message. The second processing module 122 may control the transceiver 130 so as to transmit the CAN message to the selected CAN network through the transceiver 130.

As such, in some implementations, the Ethernet frame processing process in the physical layer (PHY, MAC) is reduced when delivering the CAN message between heterogeneous communications to shorten a processing speed more effectively than the existing S/W processing.

The transceiving controller 100 may be implemented by one or more processors which operate by programs installed and set in the Ethernet controller and the gateway 20 in the vehicle, and the set programs may be programmed to perform each step of the vehicle heterogeneous communication method.

Hereinafter, peculiar configurations of the transmitting side TX and the receiving side RX of the transceiving controller 100 and the resulting heterogeneous communication method will be described through the following drawings.

Figure 5:
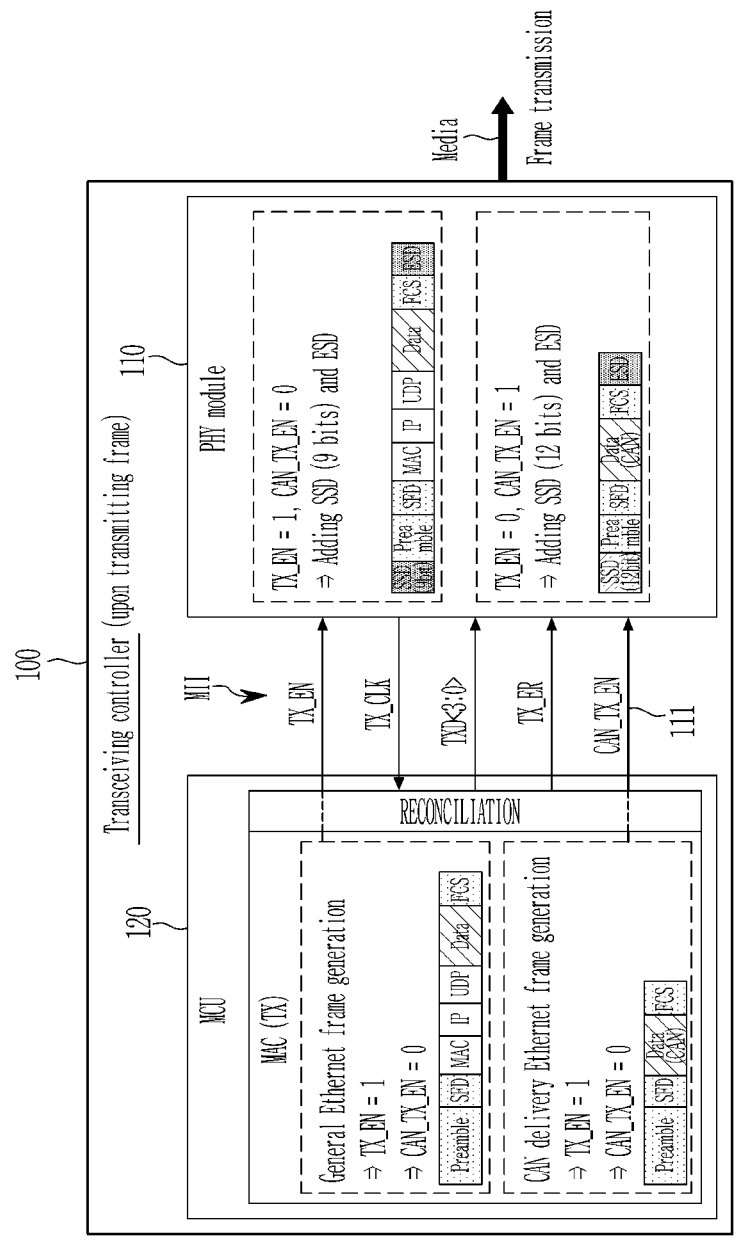
FIG. 5 illustrates an example of a transmitting side (TX) configuration of a transceiving controller and a frame transmission processing process thereof.

FIG. 5 illustrates an example of a transmitting side (TX) configuration of a transceiving controller and a frame transmission processing process thereof.

Figure 6:
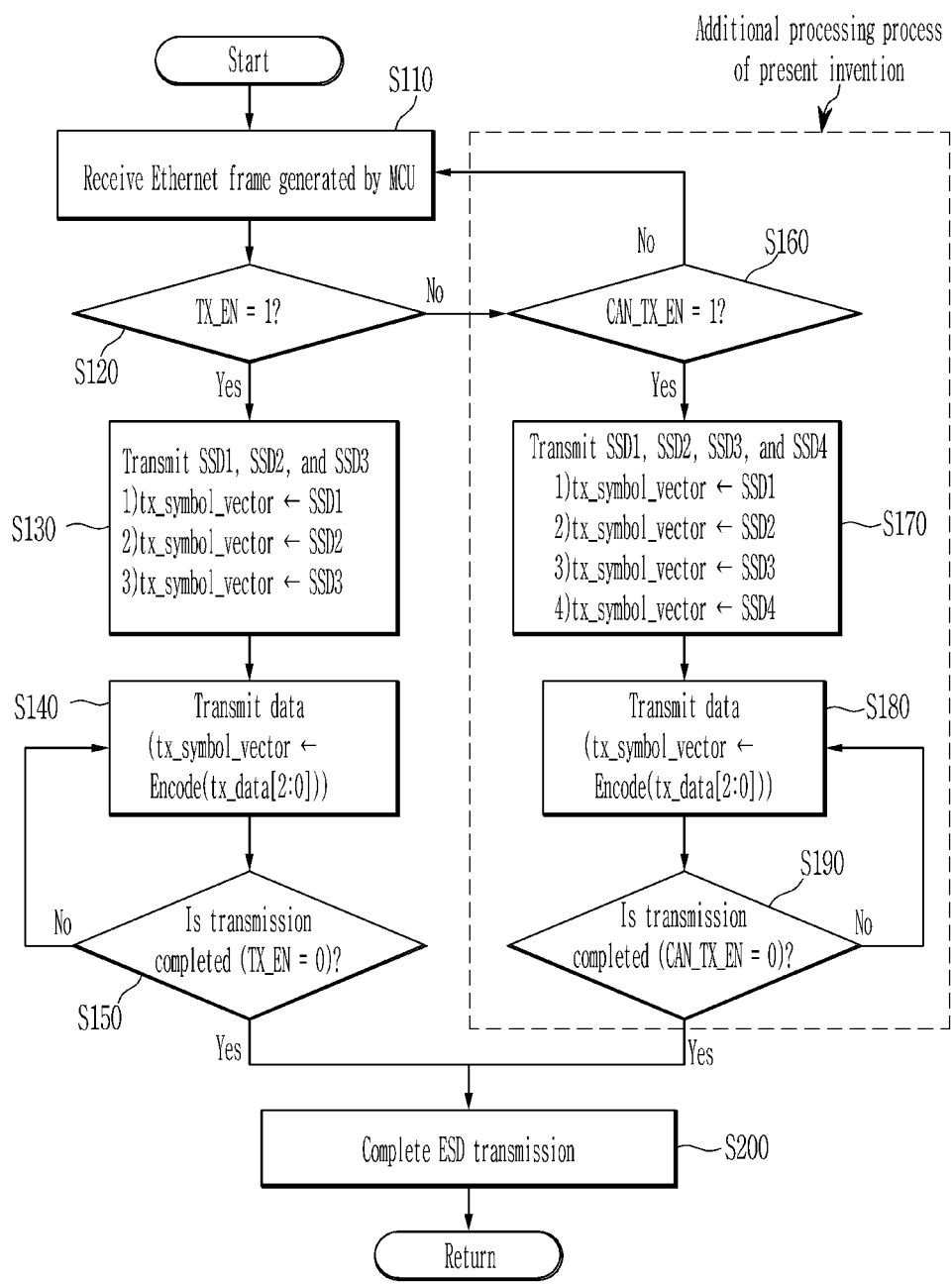
FIG. 6 illustrates an example of a message delivery method of a transmitting-side PHY.

FIG. 6 illustrates an example of a message delivery method of a transmitting-side PHY.

Referring to FIG. 5, a transmitting-side MII connecting a transmitting-side MAC (TX) of the MCU 120 and a transmitting-side PHY module 110 is configured in the transmitting side of the transceiving controller 100. In this case, the transmitting-side MII as a CAN dedicated line 111 added to a general MII line including TX_EN, TX_CLK, TXD, and TX_ER includes a signal line CAN_TX_EN. Here, the general MII line and the signal line CAN_TX_EN is used for the MCU 120 to announce which of Ethernet frame types, i.e., the general Ethernet frame and the CAN message delivery Ethernet frame the corresponding Ethernet frame is to the transmitting-side PHY module 110.

Hereinafter, "=1" marked at the end of a sign of a specific signal line of the general MII line and the CAN dedicated line is a set value when the corresponding signal line is selected, and "=0" means a set value when the corresponding signal line is not selected. Therefore, in the transmitting side, "=1" or "=0" may be set in the signal line according to the type of Ethernet frame, and may make the receiving side recognize the type of Ethernet frame.

When the transmitting-side MCU 120 transmits an Ethernet message, the MCU 120 generates a general Ethernet frame in which the SSD size is 9 bits through the MAC (TX), and selects the general MII signal line among the MII lines by setting TX_EN=1 and CAN_TX_EN=0 and deliver the Ethernet message to the transmitting-side PHY module 110.

Further, when the transmitting-side MCU 120 transmits the CAN message, the MCU 120 may generate a CAN message delivery Ethernet frame in which the SSD size is changed to 12 bits through the MAC (TX), and select the signal line CAN_TX_EN among the MII lines by setting CAN_TX_EN=1 and TX_EN=0 and deliver the CAN message to the transmitting-side PHY module 110.

Hereinafter, the message transmitting method of the transmitting-side PHY module 110 will be described in detail with reference to FIG. 6.

When the transmitting-side PHY module 110 receives the Ethernet frame generated by the transmitting-side MCU 120 (S110), the transmitting-side PHY module 110 checks whether the received MII signal line setting is TX_EN=1 or CAN_TX_EN=1 (S120 and S160). In this case, when the checked MII signal line setting is TX_EN=1 (Yes in S120), the transmitting-side PHY module 110 recognizes the corresponding Ethernet frame as the general Ethernet frame and adds three basic SSD (SSD1, SSD2, SSD3=9 bits) and the ESD to the general Ethernet frame according to the Ethernet standard and transmits the general Ethernet frame to the receiving side.

Here, the method for transmitting, by the transmitting-side PHY module 110, the general Ethernet frame will be described below in more detail.

The transmitting-side PHY module 110 transmits three SSDs (SSD1, SSD2, and SSD3) to the receiving side (S130).

The transmitting-side PHY module 110 completes transmission of three SSDs, and then transmits the remaining data to the receiving side (S140).

The transmitting-side PHY module 110 continuously checks whether data transmission is completed (S150), and when confirming the data transmission completion (TX_EN=0) (Yes in S150), the transmitting-side PHY module 110 transmits the ESD (ESD1, ESD2, and ESD3) indicating the end of the general Ethernet frame to the receiving side.

Thereafter, when the transmission of the ESD is completed, the transmitting-side PHY module 110 transmits an idle symbol to the receiving side, and then is reset.

On the contrary, when the transmitting-side PHY module 110 confirms that the MII signal line setting checked in step S120 is not TX_EN=1 but CAN_TX_EN=1 (Yes in S160), the transmitting-side PHY module 110 recognized that the CAN message delivery Ethernet frame is received. The transmitting-side PHY module 110 that recognizes that the CAN message delivery Ethernet frame is received inserts four SSDs (SSD1, SSD2, SSD3, and SSD4=12 bits) acquired by adding the SSD4 (3 bits) symbol to three basic SSD and an ESD and transmits four SSDs to the receiving side.

Here, the method for transmitting, by the transmitting-side PHY module 110, the CAN message delivery Ethernet frame will be described below in more detail.

The transmitting-side PHY module 110 transmits four SSDs (SSD1, SSD2, SSD3, and SSD4) to the receiving side (S170).

The transmitting-side PHY module 110 completes transmission of four SSDs, and then transmits the CAN message which is the remaining data to the receiving side (S180).

The transmitting-side PHY module 110 continuously checks whether data transmission is completed (S190), and when confirming the data transmission completion (CAN_TX_EN=0) (Yes in S190), the transmitting-side PHY module 110 transmits the ESD (ESD1, ESD2, and ESD3) indicating the end of the CAN message delivery Ethernet frame to the receiving side (S200).

Thereafter, when the transmission of the ESD is completed, the transmitting-side PHY module 110 transmits the idle symbol to the receiving side, and then is reset.

The transmitting-side PHY module 110 may transmit the Ethernet frame to the receiving-side gateway 20 or another Ethernet controller 10 through Media(100/1000BASE-T1). In addition, since the transmitting-side PHY module 110 supports both the transmission functions of the CAN message delivery Ethernet frame and the general Ethernet frame according to the present disclosure, the transmitting-side PHY module 110 may be compatible with the existing Ethernet controller using a PHY to which the present disclosure is not applied.

Figure 7:
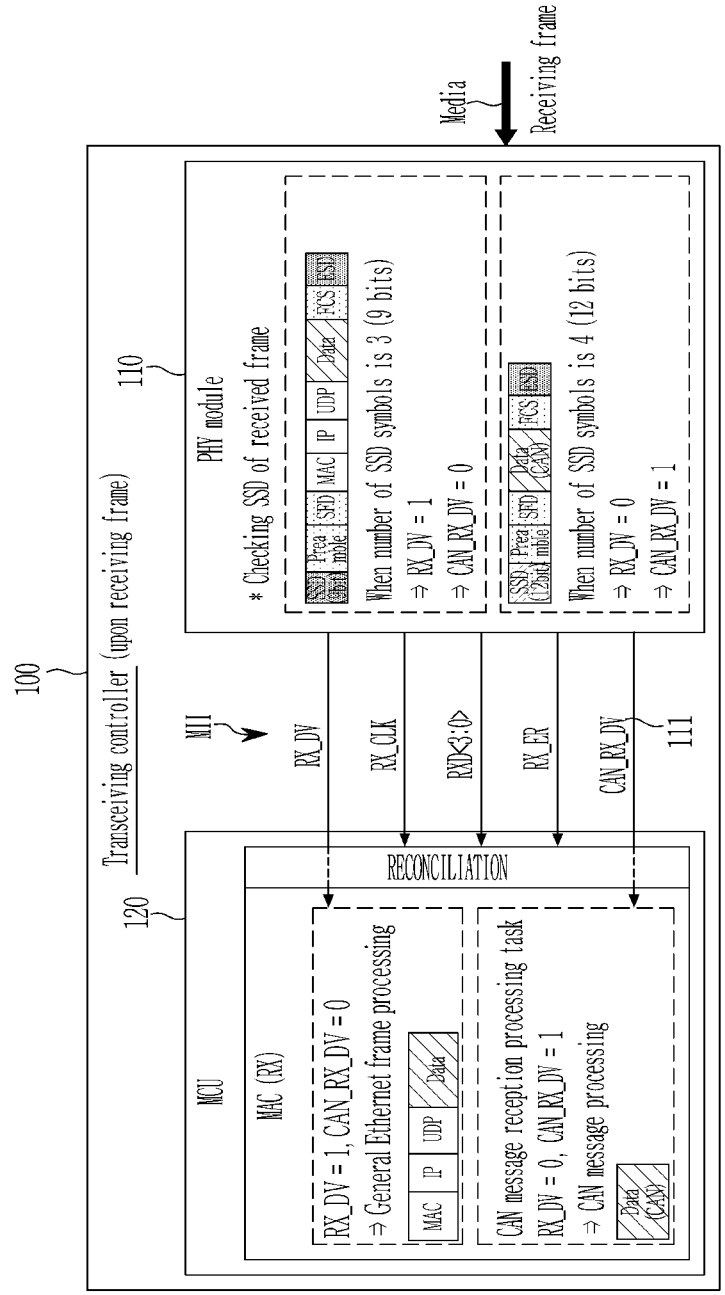
FIG. 7 illustrates an example of a receiving-side (RX) configuration of a transceiving controller and a frame reception processing process thereof.

FIG. 7 illustrates an example of a receiving-side (RX) configuration of a transceiving controller and a frame reception processing process thereof.

Figure 8:
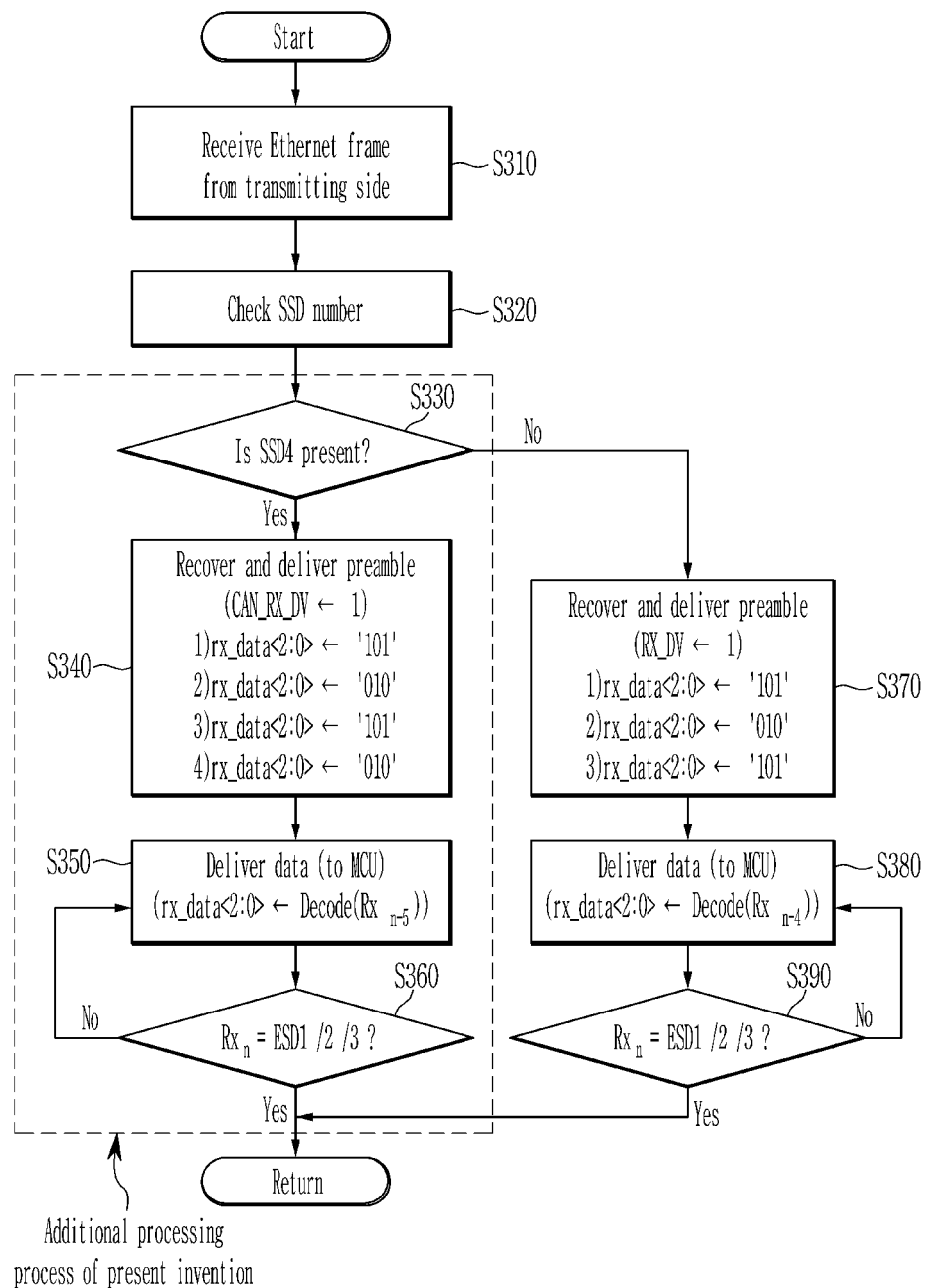
FIG. 8 is a flowchart illustrating an example of a message receiving method of a receiving-side PHY.

FIG. 8 illustrates an example of a message receiving method of a receiving-side PHY.

Referring to FIG. 7, a receiving-side MII connecting a receiving-side MAC (RX) of the MCU 120 and a receiving-side PHY module 110 is configured in the receiving side (RX) of the transceiving controller 100. In this case, the receiving-side MII includes a general MII signal line including RX_DV, RX_CLK, RXD, AND RX_ER and a signal line CAN_X_DV added as the CAN dedicated line 111. Here, the general MII signal line and the signal line CAN_RX_DV serves to make the MCU 120 recognize the type of Ethernet frame received by the receiving-side PHY module 110.

Hereinafter, the message receiving method of the receiving-side PHY module 110 will be described in detail with reference to FIG. 8.

When the receiving-side PHY module 110 receives the Ethernet frame from the transmitting side (S310), the receiving-side PHY module 110 checks the number of SSDs by frame analysis through a physical coding sublayer (PCS) (S320), and checks whether there is the symbol SSD4 (S330).

When the number of SSDs is 4 and there is the symbol SSD4, the receiving-side PHY module 110 determines the corresponding Ethernet frame as the CAN message delivery Ethernet frame (Yes in S330), and sets CAN_RX_DV=1 and RX_DV=0. The receiving-side PHY module 110 selects the signal line CAN_RX_DV added to the receiving-side MII based on the setting, and delivers the Ethernet frame to the receiving-side MCU 120 (S340). In this case, the receiving-side PHY module 110 may recover preambles for four SSDs, and then deliver the preambles.

The receiving-side PHY module 110 completes the transmission of the recovered preamble, and then delivers the CAN message which is the received remaining data to the receiving-side MCU 120 (S350).

The receiving-side PHY module 110 checks whether the ESD is received from the transmitting side when delivering data (S360), and when receiving the ESD (Yes in S360), the receiving-side PHY module 110 determines that receiving the CAN message is completed.

In this case, when the receiving-side MCU 120 receives the Ethernet frame by the signal line CAN_RX_DV through the reconciliation or confirms the MII signal line setting (CAN_RX_DV=1 and RX_DV=0), the receiving-side MCU 120 determines that the CAN message delivery Ethernet frame is received, and delivers the CAN message delivery Ethernet frame to the receiving-side MAC (RX). Thereafter, the receiving-side MAC (RX) stores only the CAN message in the internal CAN dedicated memory after processing of removing the Ether Header and the Ether Tail of the CAN message delivery Ethernet frame. Further, the receiving-side MAC (RX) may deliver the CAN message to the external CAN controller 30 through the transceiver 130 as necessary.

On the contrary, when the number of SSDs is 3 and the symbol SSD4 is not present, the receiving-side PHY module 110 determines the corresponding Ethernet frame as the general Ethernet frame (No in S330), and sets RX_DV=1 and CAN_RX_DV=0. The receiving-side PHY module 110 selects the general MII line based on the setting, and delivers the Ethernet frame to the receiving-side MCU 120 (S370). In this case, the receiving-side PHY module 110 may recover preambles for three SSDs, and then deliver the preambles.

The receiving-side PHY module 110 completes the transmission of the recovered preamble, and then delivers the received remaining data (S380).

The receiving-side PHY module 110 checks whether the ESD is received from the transmitting side when delivering data (S390), and when receiving the ESD (Yes in S390), the receiving-side PHY module 110 determines that receiving the message is completed.

In this case, when the receiving-side MCU 120 receives the Ethernet frame by the general MII line through the reconciliation or confirms setting information (RX_DV=1 and CAN_RX_DV=0), the receiving-side MCU 120 determines the corresponding Ethernet frame as the general Ethernet frame, and delivers the general Ethernet frame to the receiving-side MAC (RX). Thereafter, the receiving-side MAC (RX) may store, in the memory, data processed after performing a general Ethernet frame processing process.

As such, in some implementations, an Ethernet frame processing method of an improved physical layer (PHY, MAC) is provided for efficient CAN message delivery between the Ethernet controller and the CAN controller in the vehicle to enhance the rapid message transmission and processing time.

Further, since both the transmission functions of the CAN message delivery Ethernet frame and the general Ethernet frame according to the present disclosure are supported, which can provide 100% compatibility with the Ethernet controller of the existing vehicle using the general PHY.

Further, there can be an effect that it is not necessary to use a TCP/UDP IP stack for Ethernet communication processing, so material costs for use of an existing S/W stack can be saved.

What is claimed is:

1. A vehicle heterogeneous communication system for controller area network (CAN) message transmission between heterogeneous communication controllers in a vehicle, the system comprising:
    a first transceiving controller configured to transmit a CAN message delivery Ethernet frame to which a start of stream delimiter 4 (SSD4) symbol is added by changing a start of stream delimiter (SSD) size with respect to a first Ethernet frame; and
    a second transceiving controller configured to:
        recognize, based on the SSD4 symbol being detected by checking an SSD of Ethernet frame received from the first transceiving controller, the received Ethernet frame as the CAN message delivery Ethernet frame, and
        performing CAN message delivery Ethernet frame processing in which a media access control (MAC), Internet protocol (IP), and user datagram protocol (UDP) analysis step in processing the first Ethernet frame is omitted.

2. The vehicle heterogeneous communication system of claim 1, wherein:
    the first transceiving controller and the second transceiving controller (i) have a same configuration for message delivery between heterogeneous communications of an Ethernet and a CAN in the vehicle and (ii) are applied to at least one of an Ethernet controller or a gateway in the vehicle.

3. The vehicle heterogeneous communication system of claim 1,
    wherein a size of the CAN message delivery Ethernet frame is greater than an SSD size in the first Ethernet frame, and
    wherein a preamble is assigned to an SSD resource of the CAN message delivery Ethernet frame.

4. The vehicle heterogeneous communication system of claim 1, wherein the CAN message delivery Ethernet frame (i) does not include the MAC, IP, and UDP stacks and (ii) a frame size of the CAN message delivery Ethernet frame is less than a frame size of the first Ethernet frame.

5. The vehicle heterogeneous communication system of claim 1, wherein each of the first transceiving controller and the second transceiving controller includes:
    a micro controller unit (MCU) configured to generate the CAN message delivery Ethernet frame through MAC,
    a physical layer (PHY) module configured to support a function for transceiving the CAN message delivery Ethernet frame, and
    a media independent interface (MII) to which a CAN dedicated line is added for transmission of the CAN message delivery Ethernet frame apart from a general media independent interface (MII) line transceiving a general Ethernet frame between the MCU and the PHY module.

6. The vehicle heterogeneous communication system of claim 5, wherein the PHY module is configured to, based on the CAN message delivery Ethernet frame being transmitted, (i) generate three basic SSDs for the general Ethernet frame received through the CAN dedicated line, (ii) generate four SSDs to which a symbol SSD4 is added for the CAN message delivery Ethernet frame received through the CAN dedicated line, and (iii) transmit the generated four SSDs to a receiving side.

7. The vehicle heterogeneous communication system of claim 6, wherein the PHY module is configured to, based on the CAN message delivery Ethernet frame being received, (i) determine a corresponding Ethernet frame as the CAN message delivery Ethernet frame when there is the added SSD4 symbol by checking a number of SSDs and (ii) determine the corresponding Ethernet frame as the general Ethernet frame when the SSD4 symbol is not present.

8. The vehicle heterogeneous communication system of claim 7, wherein the PHY module is configured to:
    based on a determination that the CAN message delivery Ethernet frame is received, select the CAN dedicated line and deliver the CAN message delivery Ethernet frame to the MCU, and
    based on a determination that the general Ethernet frame is received, select the general MII line and deliver the general Ethernet frame to the MCU.

9. The vehicle heterogeneous communication system of claim 5, wherein the MCU includes:
    a first processing module configured to:
    process the general Ethernet frame received through the general MII, and
    store the processed general Ethernet frame in a memory, and a second processing module configured to:
    process the CAN message delivery Ethernet frame received through the CAN dedicated line, and
    store the processed CAN message delivery Ethernet frame in a CAN message storage memory.

10. The vehicle heterogeneous communication system of claim 9, wherein the second processing module is configured to:
    remove an Ether Header and an Ether Tail of the CAN message delivery Ethernet frame received through a CAN reception signal line, and
    store the CAN message in the CAN message storage memory.

11. The vehicle heterogeneous communication system of claim 9, wherein the second processing module is configured to:
    check a CAN ID in an APP Task when transmitting the CAN message,
    select a CAN network through which the CAN message is to be delivered, and
    transmit the CAN message to a CAN controller through a transceiver.

12. A vehicle heterogeneous communication method for controller area network (CAN) message transmission of a transceiving controller, the method comprising:
    generating, by a micro controller unit (MCU), a CAN message delivery Ethernet frame in which a start of stream delimiter (SSD) size is changed through media access control (MAC);
    delivering the CAN message delivery Ethernet frame to a physical layer (PHY) module through a CAN dedicated line added to a media independent interface (MII);

checking, by the PHY module, an Ethernet frame received through the CAN dedicated line;
recognizing the Ethernet frame as the CAN message delivery Ethernet frame;
inserting, by the PHY module, four SSDs acquired by adding an SSD4 symbol into the CAN message delivery Ethernet frame; and
transmitting the CAN message delivery Ethernet frame to a receiving side.

13. The vehicle heterogeneous communication method of claim 12,
wherein a size of the CAN message delivery Ethernet frame is less than a frame size of the Ethernet frame, and
wherein the CAN message delivery Ethernet frame does not include the MAC, IP, and UDP stacks.

14. The vehicle heterogeneous communication method of claim 12, wherein delivering the CAN message delivery Ethernet frame includes selecting, based on MII signal line being set to CAN_TX_EN=1 and TX_EN=0, the CAN dedicated line among the MII lines.

15. The vehicle heterogeneous communication method of claim 14, wherein checking the Ethernet frame includes:
checking, by the PHY module, whether the MII signal line setting is TX_EN=1 or CAN_TX_EN=1 based on the Ethernet frame being received, determining an corresponding Ethernet frame as a general Ethernet frame when the MII signal line setting is TX_EN=1, and determining the corresponding Ethernet frame as the CAN message delivery Ethernet frame when the MII signal line setting is CAN_TX_EN=1.

16. The vehicle heterogeneous communication method of claim 14, wherein inserting the four SSDs includes:
transmitting the four SSDs to the receiving side,
transmitting a CAN message that is the remaining data to the receiving side after completing transmission of the four SSDs, and
transmitting, to the receiving side, an end delimiter (ESD) indicating an end of the CAN message delivery Ethernet frame based on data transmission completion being confirmed.

17. A vehicle heterogeneous communication method for CAN message reception of a transceiving controller, comprising:
checking, by a physical layer (PHY) module, presence of a start of stream delimiter 4 (SSD4) symbol by checking a number of SSDs based on an Ethernet frame being received from a transmitting side;
determining a corresponding Ethernet frame as a CAN message delivery Ethernet frame based on the number of SSDs being 4 and the SSD4 symbol being present;
delivering the CAN message delivery Ethernet frame to an MCU through a controller area network (CAN) dedicated line added to a media independent interface (MII);
performing, by the MCU, processing of the CAN message delivery Ethernet frame through media access control (MAC); and
storing the CAN message delivery Ethernet frame in an internal CAN message storage memory.

18. The vehicle heterogeneous communication method of claim 17,
wherein the CAN message delivery Ethernet frame does not include MAC, IP, and user datagram protocol (UDP) stacks, and
wherein a size of the CAN message delivery Ethernet frame is less than a size of the Ethernet frame.

19. The vehicle heterogeneous communication method of claim 17, wherein delivering the CAN message delivery Ethernet frame includes:
recovering preambles for four SSDs of the CAN message delivery Ethernet frame,
delivering the recovered preambles to the MCU,
delivering a CAN message that is the remaining data to the MCU after completing transmission of the recovered preambles, and
determining that receiving the CAN message is completed based on an end delimiter (ESD) being received from the transmitting side.

20. The vehicle heterogeneous communication method of claim 17, wherein performing the processing of the CAN message delivery Ethernet frame includes:
determining, based on the CAN dedicated line frame being received or MII signal line setting being checked to be CAN_RX_DV=1, that the CAN message delivery Ethernet frame is received,
delivering the CAN message delivery Ethernet frame through MAC, by a reconciliation of the MCU, and
storing the CAN message in the internal CAN dedicated memory after removing an Ether Header and an Ether Tail of the CAN message delivery Ethernet frame in the MAC.

* * * * *